(12) United States Patent
Kanauchi et al.

(10) Patent No.: US 12,002,005 B2
(45) Date of Patent: Jun. 4, 2024

(54) DELIVERY ASSIST APPARATUS, DELIVERY ASSIST SYSTEM, AND DELIVERY ASSIST METHOD

(71) Applicant: KYOCERA CORPORATION, Kyoto (JP)

(72) Inventors: Yoshiteru Kanauchi, Kyoto (JP); Takao Oshida, Kyoto (JP); Masaya Takahashi, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 220 days.

(21) Appl. No.: 17/595,242

(22) PCT Filed: Apr. 22, 2020

(86) PCT No.: PCT/JP2020/017277
§ 371 (c)(1),
(2) Date: Nov. 12, 2021

(87) PCT Pub. No.: WO2020/230553
PCT Pub. Date: Nov. 19, 2020

(65) Prior Publication Data
US 2022/0261739 A1 Aug. 18, 2022

(30) Foreign Application Priority Data
May 13, 2019 (JP) .................. 2019-090354

(51) Int. Cl.
*G06Q 10/087* (2023.01)
*G06Q 10/0631* (2023.01)
(Continued)

(52) U.S. Cl.
CPC ..... *G06Q 10/087* (2013.01); *G06Q 10/06312* (2013.01); *G06Q 10/06315* (2013.01); *G06Q 10/083* (2013.01)

(58) Field of Classification Search
CPC ........... G06Q 10/087; G06Q 10/06312; G06Q 10/06315; G06Q 10/083; G06Q 10/04; G06Q 10/08
(Continued)

(56) References Cited

U.S. PATENT DOCUMENTS 9,741,010 B1 * 8/2017 Heinla .................. G06Q 10/083
2015/0168260 A1 * 6/2015 Adams .................. F01N 3/2033
60/277
(Continued)

FOREIGN PATENT DOCUMENTS

JP  2009157890 A  7/2009
JP  201733341 A  2/2017
(Continued)

*Primary Examiner* — Garcia Ade
(74) *Attorney, Agent, or Firm* — HAUPTMAN HAM, LLP

(57) ABSTRACT

A delivery assist apparatus includes: a receiver configured to receive power data of at least one facility included in two or more predetermined facilities located in a predetermined area; and a controller configured to determine a procedure of delivering goods to the two or more predetermined facilities, based on the power data. At first timing, the controller executes a first procedure of determining a target area out of two or more delivery areas included in the predetermined area, based on the power data satisfying a first condition based on the first timing. At second timing after the first timing, the controller executes a second procedure of determining a delivery schedule of the goods for two or more target facilities located in the target area, based on the power data satisfying a second condition based on the second timing.

19 Claims, 7 Drawing Sheets

(51) Int. Cl.
*G06Q 10/083* (2023.01)
*G06Q 10/08* (2023.01)

(58) Field of Classification Search
USPC .......................................................... 705/28
See application file for complete search history.

(56) References Cited

U.S. PATENT DOCUMENTS

| | | | |
|---|---|---|---|
| 2019/0188629 A1* | 6/2019 | Fujisawa | G06Q 10/08 |
| 2019/0251502 A1* | 8/2019 | Fujisawa | G06F 16/9535 |

FOREIGN PATENT DOCUMENTS

| | | | |
|---|---|---|---|
| JP | 2018181236 A | 11/2018 | |
| WO | 2015122196 A1 | 8/2015 | |

* cited by examiner

DELIVERY ASSIST APPARATUS, DELIVERY ASSIST SYSTEM, AND DELIVERY ASSIST METHOD

RELATED APPLICATIONS

The present application is a National Phase of International Application No. PCT/JP2020/017277 filed Apr. 22, 2020, which claims priority to Japanese Application No. 2019-090354, filed May 13, 2019.

TECHNICAL FIELD

The present disclosure relates to a delivery assist apparatus, a delivery assist system, and a delivery assist method.

BACKGROUND ART

There has been a known system for determining whether a user is at a facility, based on temporal variations of power consumption of the facility. Information related to whether the user is at the facility is utilized for a goods delivery service (for example, PTL 1).

CITATION LIST

Patent Literature

PTL 1: JP 2018-181236 A

SUMMARY OF INVENTION

The first feature is a delivery assist apparatus, including: a receiver configured to receive power data of at least one facility among two or more predetermined facilities located in a predetermined area; and a controller configured to determine a procedure of delivering goods to the two or more predetermined facilities, based on the power data. At first timing, the controller executes a first procedure of determining a target area out of two or more delivery areas included in the predetermined area, based on the power data satisfying a first condition based on the first timing. At second timing after the first timing, the controller executes a second procedure of determining a delivery schedule of the goods for two or more target facilities located in the target area, based on the power data satisfying a second condition based on the second timing.

The second feature is a delivery assist system, including: a receiver configured to receive power data of at least one facility among two or more predetermined facilities located in a predetermined area; and a controller configured to determine a procedure of delivering goods to the two or more predetermined facilities, based on the power data. At first timing, the controller executes a first procedure of determining a target area out of two or more delivery areas included in the predetermined area, based on the power data satisfying a first condition based on the first timing. At second timing after the first timing, the controller executes a second procedure of determining a delivery schedule of the goods for two or more target facilities located in the target area, based on the power data satisfying a second condition based on the second timing.

The third feature is a delivery assist method, including the steps of: receiving power data of at least one facility among two or more predetermined facilities located in a predetermined area; at first timing, executing a first procedure of determining a target area out of two or more delivery areas included in the predetermined area, based on the power data satisfying a first condition based on the first timing; and at second timing after the first timing, executing a second procedure of determining a delivery schedule of goods for two or more target facilities located in the target area, based on the power data satisfying a second condition based on the second timing.

DESCRIPTION OF EMBODIMENTS

Embodiments will be described below with reference to the drawings. Note that, in the following description regarding the drawings, the same or similar parts are denoted by the same or similar reference signs. Note that the drawings are schematic drawings.

Embodiment

Delivery Assist System

Figure 1:
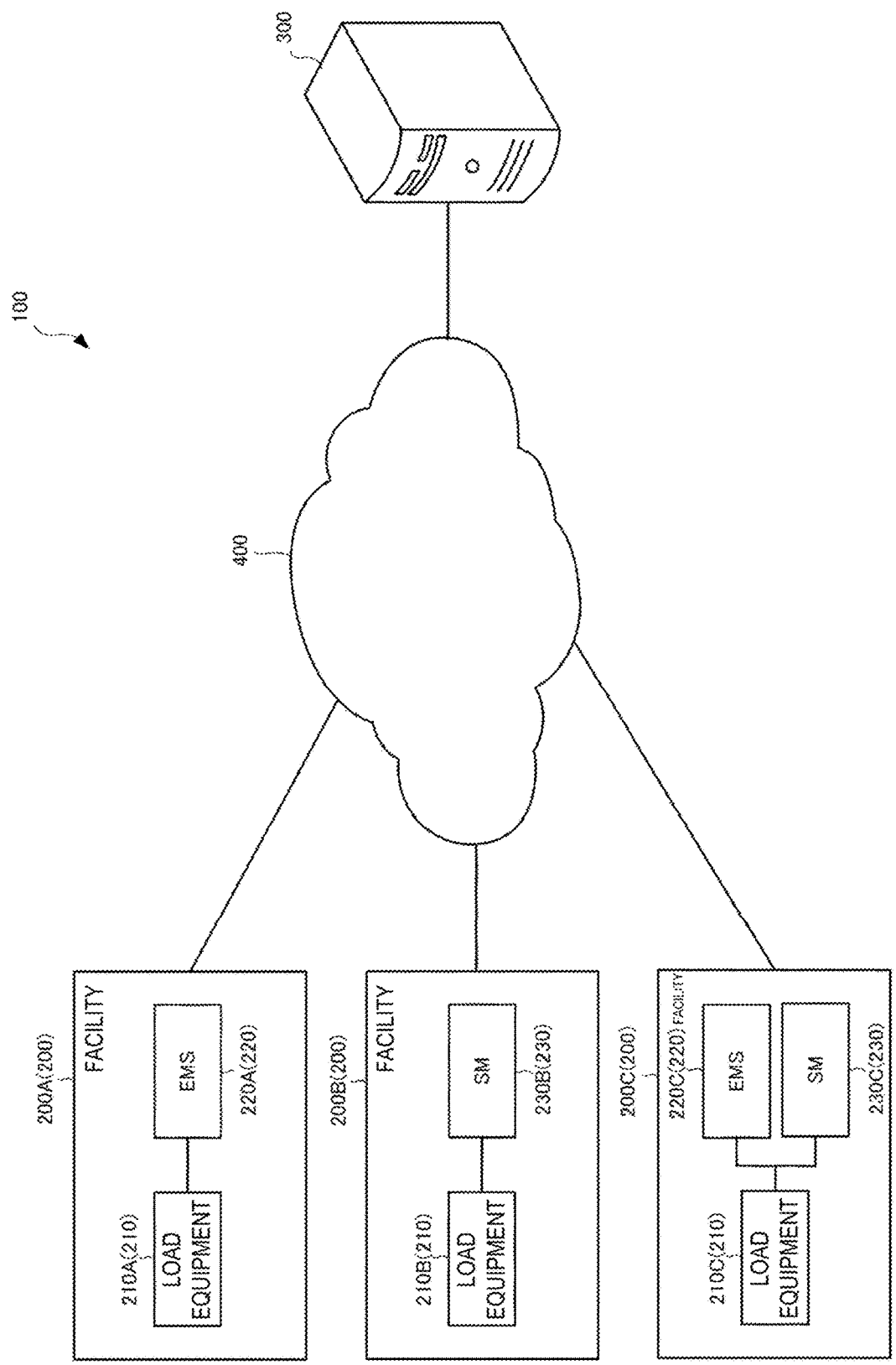
FIG. 1 is a diagram illustrating a delivery assist system 100 according to an embodiment.

A delivery assist system according to an embodiment will be described below. As illustrated in FIG. 1, a delivery assist system 100 includes facilities 200 and a delivery assist apparatus 300. The facilities 200 and the delivery assist apparatus 300 are connected by a network 400. The network 400 may include a network for the Internet, or may include a mobile communication network. The network 400 may include a virtual private network (VPN).

Each facility 200 is an example of a predetermined facility to which goods are delivered. The facility 200 may be a facility of an individual customer of a delivery agent, or may be a facility of a corporate customer of a delivery agent. FIG. 1 illustrates an example of a facility 200A, a facility 200B, and a facility 200C, as the facilities 200. The facility 200A includes load equipment 210 (load equipment 210A) and an EMS 220 (EMS 220A). The facility 200B includes load equipment 210 (load equipment 210B) and an SM 230 (SM 230B). The facility 200C includes load equipment 210 (load equipment 210C), an EMS 220 (EMS 220C), and an SM 230 (SM 230C). Although not illustrated in FIG. 1, the facilities 200 may include a facility that does not include the EMS 220 and the SM 230.

The load equipment 210 is equipment that consumes power. The load equipment 210 includes an air conditioner, a piece of lighting equipment, a household electric appliance, and the like. Here, the facility 200 may include a distributed power source, in addition to the load equipment 210. The distributed power source may include a solar cell apparatus, a fuel cell apparatus, a power storage apparatus, and the like.

The EMS 220 is a management apparatus (Energy Management System) that manages power of the facility 200. The EMS 220 may be provided by a cloud service. The EMS 220 has at least a function of performing communication with the delivery assist apparatus 300 and a function of obtaining power of the facility 200. The function of obtaining power of the facility 200 may be a function of receiving, from a current transformer (CT), power data that is measured by the CT connected to a portion of a main power line anterior to a point of branch in a power distribution panel although the function is not specifically limited thereto. The EMS 220 transmits power data (hereinafter second power data) of the facility 200 to the delivery assist apparatus 300. The second power data includes data of power (power flow) from a power system to the facility 200. When the facility 200 includes a distributed power source, the second power data may include data of power (reverse power flow) from the facility 200 to the power system.

The SM 230 is a smart meter that measures power of the facility 200. The SM 230 has at least a function of performing communication with the delivery assist apparatus 300 and a function of measuring power of the facility 200. The SM 230 transmits power data (hereinafter first power data) of the facility 200 to the delivery assist apparatus 300. The first power data may include data of power (power flow) from the power system to the facility 200, and includes data of power (reverse power flow) from the facility 200 to the power system.

Here, the first power data may be transmitted from the SM 230 to the delivery assist apparatus 300 at a first interval (for example, 30 minutes). The second power data may be transmitted from the EMS 220 to the delivery assist apparatus 300 at a second interval (for example, 1 second). The second interval may be shorter than the first interval. In such a case, the first power data may be data indicating an integrated power value at the first interval. Similarly, the second power data may be data indicating an integrated power value at the second interval. Note that, when the second interval is extremely small, the second power data may be an instantaneous power value.

In FIG. 1, the facility 200B and the facility 200C are each an example of a first facility including the SM 230. The facility 200A and the facility 200C are each an example of a second facility including the EMS 220. In the facility 200C including both of the EMS 220C and the SM 230C, the EMS 220C may transmit data of power measured by the SM 230C to the delivery assist apparatus 300 as the second power data. In such a case as well, the SM 230C may transmit data of power measured by the SM 230C to the delivery assist apparatus 300 as the first power data. A route of the first power data transmitted from the SM 230 may be referred to as route A. A route of the second power data transmitted from the EMS 220 may be referred to as route B. In such a case, the delivery assist apparatus 300 may determine a route used for one facility 200, based on a route used for another facility 200.

The delivery assist apparatus 300 is an apparatus that assists delivery of goods by a delivery agent. The delivery assist apparatus 300 receives power data of at least one facility 200. Specifically, the delivery assist apparatus 300 receives power data from at least one of the EMS 220 or the SM 230. The details of the delivery assist apparatus 300 will be described later (see FIG. 2).

Delivery Assist Apparatus

Figure 2:
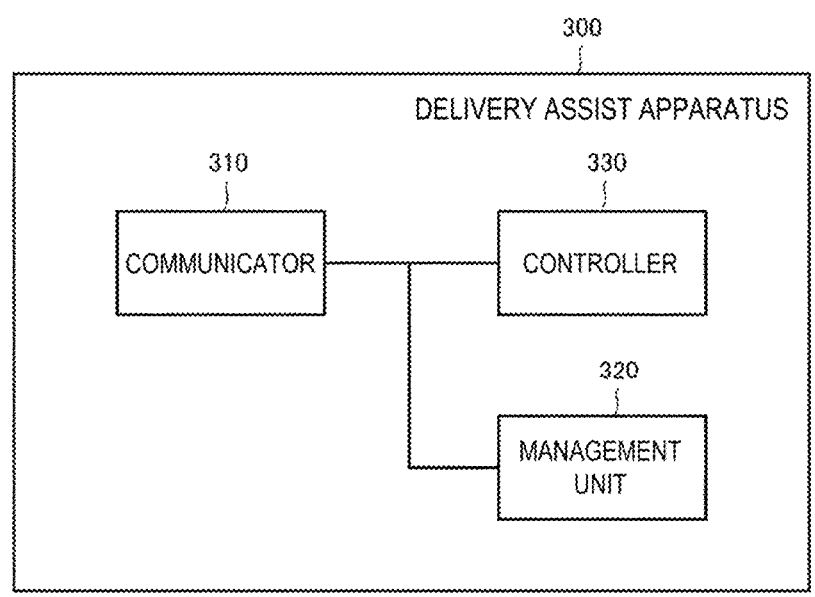
FIG. 2 is a diagram illustrating a delivery assist apparatus 300 according to the embodiment.

The delivery assist apparatus according to an embodiment will be described below. As illustrated in FIG. 2, the delivery assist apparatus 300 includes a communicator 310, a management unit 320, and a controller 330.

The communicator 310 includes a communication module. The communication module may be a radio communication module in compliance with a standard such as IEEE802.11a/b/g/n, ZigBee, Wi-SUN, LTE, 5G, and 6G, or may be a wired communication module in compliance with a standard such as IEEE802.3.

The communicator 310 receives power data of at least one facility 200. The communicator 310 may receive the second power data from the EMS 220, or may receive the first power data from the SM 230.

The management unit 320 includes a storage medium such as memory (e.g., a non-volatile memory) and/or a hard disk drive (HDD), and stores various pieces of information.

Figure 3:
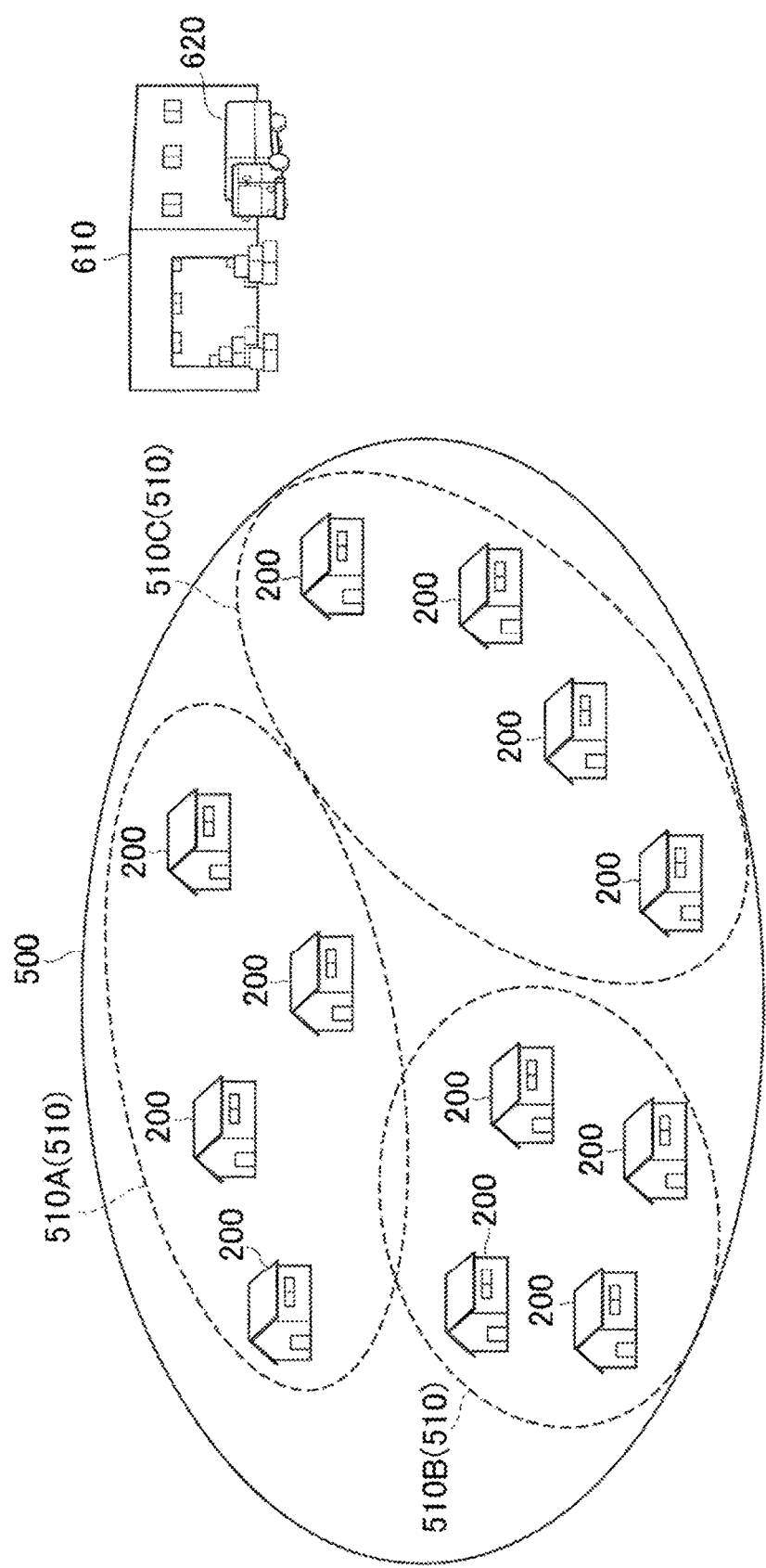
FIG. 3 is a diagram for illustrating a predetermined area according to the embodiment.

The management unit 320 may manage a predetermined area 500 illustrated in FIG. 3. The predetermined area 500 includes two or more delivery areas 510 (in FIG. 3, a delivery area 510A, a delivery area 510B, and a delivery area 510C). The management unit 320 may manage two or more facilities 200 located in each delivery area 510. For example, the management unit 320 may manage geographical positions of the delivery areas 510 and the facilities 200. In such a case, the management unit 320 may manage geographical positions of the facilities 200 for each delivery area 510, or may manage geographical positions of all of the facilities 200 located in the predetermined area 500 so as to allocate the facilities 200 to the delivery areas 510. The predetermined area 500 may be considered to be an area controlled by a logistics site 610 described below. More specifically, the predetermined area 500 may be considered to be an area in which goods are delivered by a delivery vehicle 620 described below.

In addition, the management unit 320 may manage the logistics site 610 and the delivery vehicle 620. For example, the management unit 320 manages geographical positions of the logistics site 610 and the delivery vehicle 620. The delivery vehicle 620 may include a reception apparatus using the Global Navigation Satellite System (GNSS), and data indicating the geographical position of the delivery vehicle 620 may be transmitted from the delivery vehicle 620 to the delivery assist apparatus 300.

Here, the management unit 320 may manage map data and traffic congestion data. According to such a configuration, a time period (movement time period) during which the delivery vehicle 620 moves from the logistics site 610 to each delivery area 510 can be identified. The movement time period may be corrected with the geographical position of the delivery vehicle 620.

The controller 330 may include at least one processor. The at least one processor may include a single integrated circuit (IC), or may include a plurality of communicably connected circuits (integrated circuits, discrete circuits, and/or the like).

The controller 330 determines a procedure of delivering goods to two or more facilities 200, based on the power data. Specifically, at first timing, the controller 330 executes a first procedure of determining a target area out of the two or more delivery areas 510 included in the predetermined area 500, based on the power data. In such a case, when the delivery vehicle 620 that is in charge of the delivery area 510 is determined in advance, the determination of the target area may be interpreted as determination of the delivery vehicle 620. The determination of the delivery vehicle 620 may be performed through input of information for identifying the delivery vehicle 620. In the determination of the delivery vehicle 620, the target area may be interpreted as a delivery priority area. At second timing after the first timing, the controller 330 executes a second procedure of determining a delivery schedule of goods for two or more target facilities located in the target area, based on the power data. For example, the first timing may be timing at which the delivery vehicle 620 departs from the logistics site 610, or timing at which goods are loaded into the delivery vehicle 620. The second timing may be timing at which the delivery vehicle 620 arrives at or approaches the target area.

At third timing after the second timing, the controller 330 may update the delivery schedule of goods, based on the power data. The third timing may be timing at which the target facility located in the target area is visited. The third timing may be timing at which delivery of goods is completed, or may be timing at which delivery of goods fails to be completed because of absence of a recipient or the like.

Here, the controller 330 may determine an order of visiting the two or more target facilities located in the target area as the delivery schedule of goods. The controller 330 may determine a route for visiting the two or more target facilities located in the target area as the delivery schedule of goods. The controller 330 may determine both of the order of visiting the two or more target facilities and the route for visiting the two or more target facilities as the delivery schedule of goods.

Method of Determining Delivery Procedure

An example of a method of determining a delivery procedure according to an embodiment will be described below. Here, a case in which the number of facilities 200 including the SM 230 is larger than the number of facilities 200 including the EMS 220 will be described. As illustrated in FIG. 1, the facilities 200 may include a facility including both of the EMS 220 and the SM 230. In addition, the facilities 200 may include a facility including neither the EMS 220 nor the SM 230.

Firstly, at the first timing, the delivery assist apparatus 300 executes the first procedure, based at least on the first power data received at the first interval. As described above, the first timing may be timing at which the delivery vehicle 620 departs from the logistics site 610. Here, the power data referred to in the first procedure is power data that satisfies a first condition based on the first timing. It is only necessary that the first condition be a condition for securing real-time characteristics. For example, the first condition may be a condition that reception is performed immediately close in time to the first timing, or may be a condition that reception is performed within a certain period (for example, 30 minutes) from the first timing. In the first procedure, one piece of power data may be referred to regarding one facility 200, or two or more pieces of power data may be referred to regarding one facility 200.

Specifically, the delivery assist apparatus 300 determines whether the user is at the facility 200, based on the first power data. For example, when the power of the facility 200 exceeds a threshold at the first timing, the delivery assist apparatus 300 may determine that the user is at the facility 200, whereas when the power of the facility 200 does not exceed the threshold at the first timing, the delivery assist apparatus 300 may determine that the user is not at the facility 200. Next, the delivery assist apparatus 300 determines the target area, based on whether users are at the facility 200. For example, the delivery assist apparatus 300 determines the delivery area 510 having the largest number of facilities 200 with users being present as the target area.

Secondly, at the second timing after the first timing, the delivery assist apparatus 300 executes the second procedure, based at least on the second power data received at the second interval shorter than the first interval. As described above, the second timing may be timing at which the delivery vehicle 620 arrives at or comes close to the target area. Here, the power data referred to in the second procedure is power data that satisfies a second condition based on the second timing. It is only necessary that the second condition be a condition for securing real-time characteristics. For example, the second condition may be a condition that reception is performed immediately before or after to the second timing, or may be a condition that reception is performed within a certain period (for example, 20 minutes) from the second timing. In the second procedure, one piece of power data may be referred to regarding one facility 200, or two or more pieces of power data may be referred to regarding one facility 200.

Specifically, the delivery assist apparatus 300 determines whether the user is at the facility 200, based on the second power data. For example, when the power of the facility 200 exceeds a threshold at the second timing, the delivery assist apparatus 300 may determine that the user is at the facility 200, whereas when the power of the facility 200 does not exceed the threshold at the second timing, the delivery assist apparatus 300 may determine that the user is not at the facility 200. Next, the delivery assist apparatus 300 determines the delivery schedule of goods, based on whether the user is at the facility 200. For example, the delivery assist apparatus 300 determines the delivery schedule for preferentially delivering goods to the facility 200 at which it is determined that the user is present over the facility 200 at which it is determined that the user is not present.

Thirdly, at the third timing after the second timing, the delivery assist apparatus 300 updates the delivery schedule of goods, based on the second power data received at the second interval shorter than the first interval. As described above, the third timing may be timing at which the target facility located in the target area is visited. Alternatively, the third timing may be timing repeated at any time interval after the delivery vehicle 620 arrives at the target area.

Here, the power data referred to in the update of the delivery schedule is power data that satisfies a third condition based on the third timing. It is only necessary that the third condition be a condition for securing real-time characteristics. For example, the third condition may be a condition that reception is performed immediately before or after the third timing, or may be a condition that reception is performed within a certain period (for example, 10 minutes) from the third timing. In the update of the delivery schedule, one piece of power data may be referred to for one facility 200, or two or more pieces of power data may be referred to for one facility 200.

Specifically, similarly to the second procedure, the delivery assist apparatus 300 determines whether the user is at the facility 200, based on the second power data. Next, the delivery assist apparatus 300 updates the delivery schedule of goods, based on whether the user is at the facility 200. A method of updating the delivery schedule of goods may be similar to the method of determining the delivery schedule of goods.

Here, the above illustrates an example of a case in which the first procedure is executed based on the first power data and the second procedure is executed based on the second power data. However, the embodiment is not limited to this. The first procedure may be executed based on both of the first power data and the second power data. Similarly, the second procedure may be executed based on both of the first power data and the second power data.

It is to be noted that the first power data has an advantage in that the population of facilities 200 that can transmit the first power data is large, and the second power data has an advantage in that it has real-time characteristics better than those of the first power data. Thus, when the second power data is used in the second procedure, the second power data whose time period that has elapsed from measurement does not exceed a threshold may be used without using the second power data whose time period that has elapsed from measurement exceeds the threshold.

When the visit at the facilities 200 located in the target area finishes, the first procedure and the second procedure are executed again. In such a case, the first procedure is a procedure of determining the target area out of the rest of the delivery areas 510, except for the delivery area 510 already selected as the target area.

Delivery Assist Method

Figure 4:
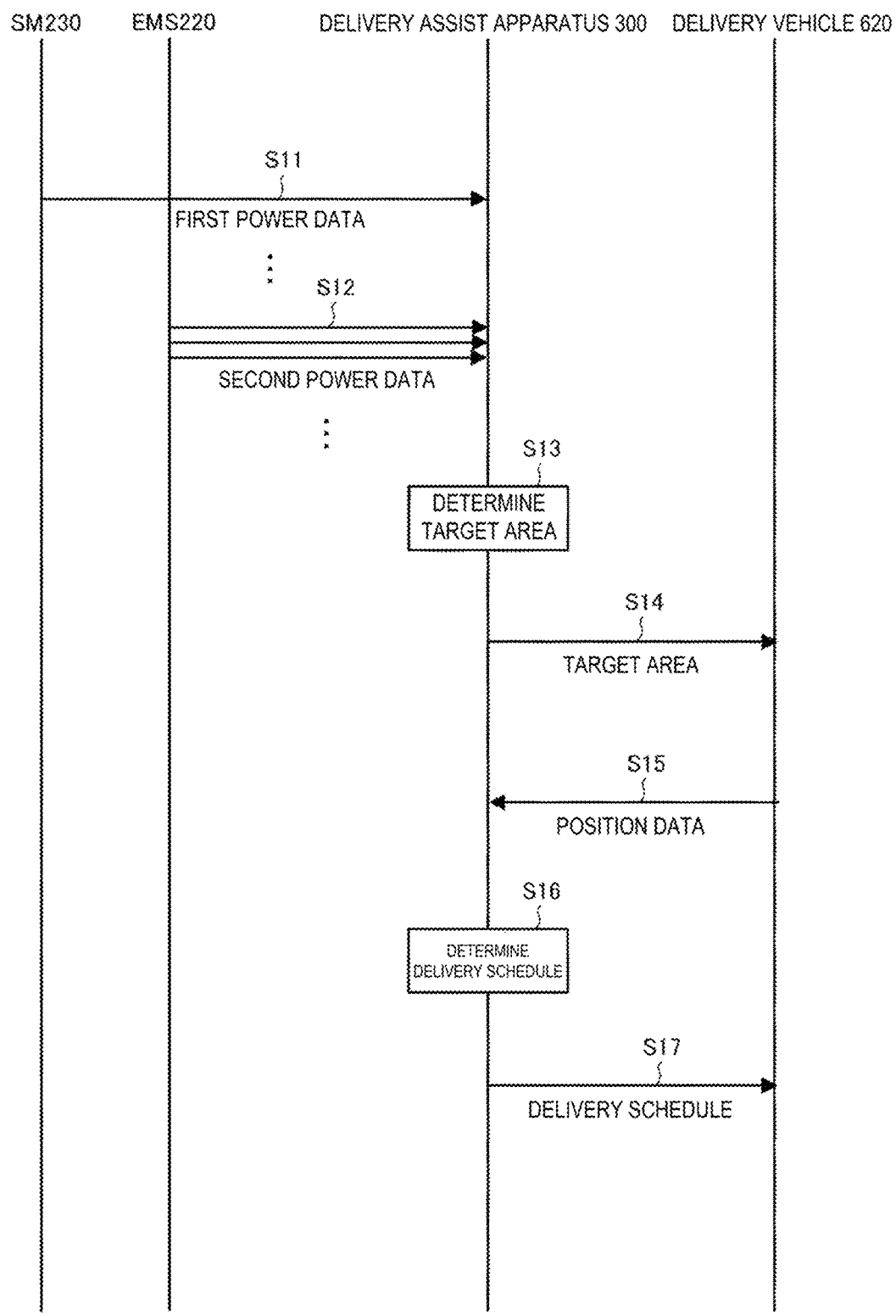
FIG. 4 is a diagram illustrating a delivery assist method according to the embodiment.

A delivery assist method according to an embodiment will be described below. In FIG. 4, a case in which the facilities 200 including the SM 230 and the facilities 200 including the EMS 220 coexist and the number of facilities 200 including the SM 230 is larger than the number of facilities 200 including the EMS 220 will be described.

As illustrated in FIG. 4, in Step S11, the delivery assist apparatus 300 receives the first power data from the SM 230 at the first interval. The reception of the first power data continues even after the step.

In Step S12, the delivery assist apparatus 300 receives the second power data from the EMS 220 at the second interval shorter than the first interval. The reception of the second power data continues even after the step.

In Step S13, at the first timing, the delivery assist apparatus 300 executes the first procedure, based on the first power data. The delivery assist apparatus 300 may execute the first procedure, based on the first power data and the second power data. In other words, the delivery assist apparatus 300 determines the target area out of two or more delivery areas 510 included in the predetermined area 500, based on the power data.

In Step S14, the delivery assist apparatus 300 notifies the delivery vehicle 620 of the target area.

In Step S15, the delivery assist apparatus 300 receives data (hereinafter position data) indicating the geographical position of the delivery vehicle 620. The delivery assist apparatus 300 may periodically receive the position data, or may receive the position data at timing of arriving at or approaching the target area.

In Step S16, at the second timing after the first timing, the delivery assist apparatus 300 executes the second procedure, based on the second power data. The delivery assist apparatus 300 may execute the second procedure, based on the first power data and the second power data. In other words, the delivery assist apparatus 300 determines the delivery schedule of goods for two or more target facilities located in the target area, based on the power data.

As described above, the second timing may be timing at which the delivery vehicle 620 arrives at or comes close to the target area. The delivery assist apparatus 300 may specify the second timing, based on the position data received from the delivery vehicle 620.

In Step S17, the delivery assist apparatus 300 transmits the delivery schedule determined in Step S16 to the delivery vehicle 620.

Figure 5:
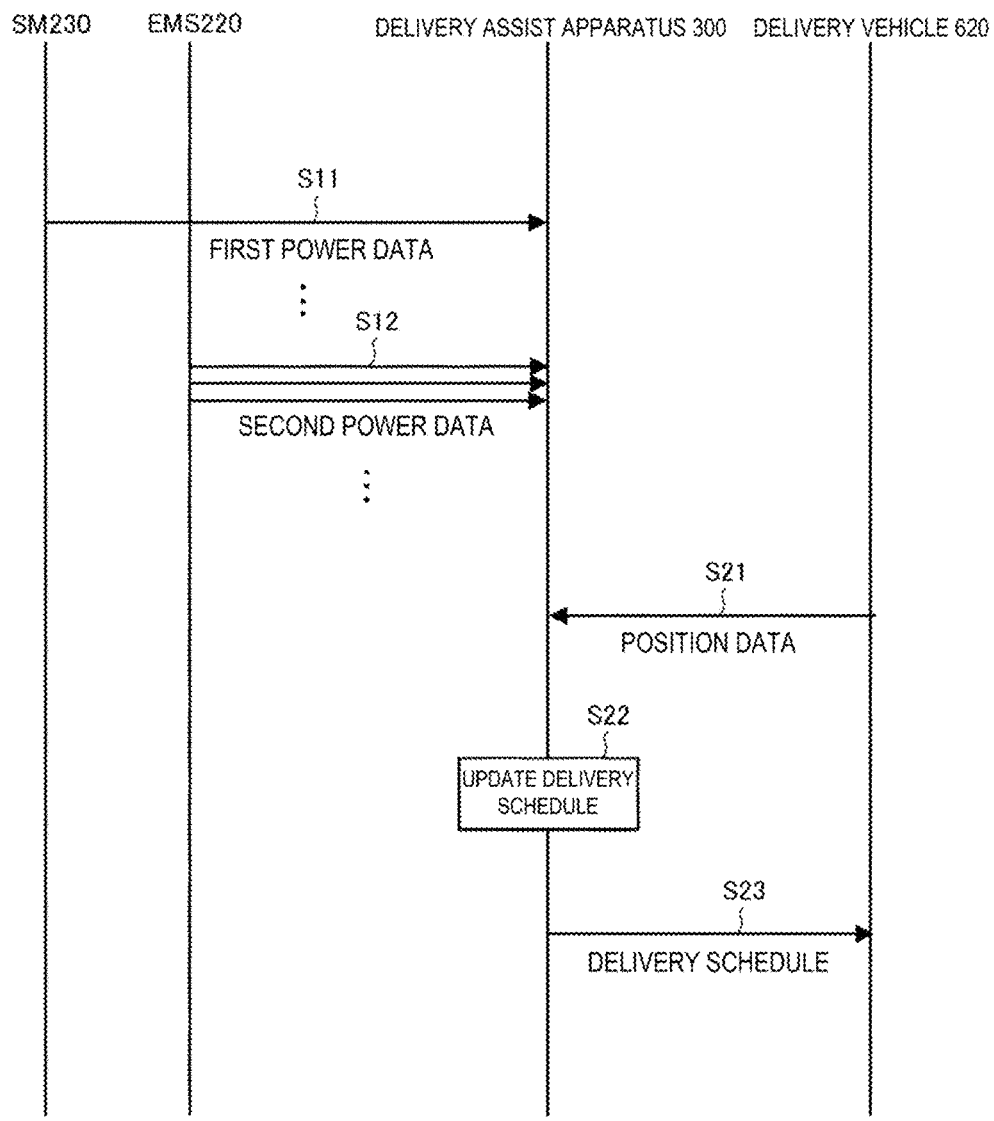
FIG. 5 is a diagram illustrating the delivery assist method according to the embodiment.

In addition, as illustrated in FIG. 5, in Step S21, the delivery assist apparatus 300 receives data (hereinafter position data) indicating the geographical position of the delivery vehicle 620. The delivery assist apparatus 300 may periodically receive the position data, or may receive the position data at the timing of visiting of the target facility.

In Step S22, at the third timing after the second timing, the delivery assist apparatus 300 updates the delivery schedule, based on the second power data. The delivery assist apparatus 300 may update the delivery schedule, based on the first power data and the second power data. Here, the delivery assist apparatus 300 may update the delivery schedule, based on changed power data different from the power data referred to at the second timing.

As described above, the third timing may be timing at which the target facility located in the target area is visited. The delivery assist apparatus 300 may identify the third timing, based on the position data received from the delivery vehicle 620. Alternatively, the delivery assist apparatus 300 may identify the third timing, based on a completion notice transmitted from a terminal of a delivery person. The completion notice is a notice indicating that the target facility has been visited. The completion notice may be a notice indicating that delivery of goods has been completed, or may be a notice indicating that delivery of goods failed to be completed because of absence of a recipient or the like.

In Step S23, the delivery assist apparatus 300 transmits the delivery schedule updated in Step S22 to the delivery vehicle 620.

Actions and Effects

In the embodiment, at the first timing, the delivery assist apparatus 300 executes the first procedure of determining the target area, based on the power data, and at the second timing after the first timing, the delivery assist apparatus 300 executes the second procedure of determining the delivery schedule of goods, based on the power data. According to such a configuration, in view of a situation in which the power data for determining whether the user is at the facility 200 becomes increasingly older from moment to moment, the delivery schedule of goods for the facilities 200 can be appropriately determined by performing the first procedure of determining the target area and the second procedure of determining the delivery schedule in two steps.

In the embodiment, at the third timing after the second timing, the delivery assist apparatus 300 updates the delivery schedule of goods, based on the power data. According to such a configuration, whether the user is at the facility 200 can be determined based on the power data having better real-time characteristics, and the delivery schedule of goods for the facilities 200 can be appropriately updated.

In the embodiment, in view of large population of the facilities 200 that can transmit the first power data, the first procedure may be executed based on the first power data. According to such a configuration, the target area can be appropriately determined.

In the embodiment, in view of better real-time characteristics of the second power data, the second procedure may be executed based on the second power data. According to such a configuration, the delivery schedule in the target area can be appropriately determined.

Modification 1

Modification 1 of the embodiment will be described below. Differences from the embodiment will mainly be described below.

In modification 1, the delivery assist apparatus 300 may transmit contents related to the delivery schedule of goods to at least one of a user terminal of the user or the EMS 220 of the facility 200. The contents may include delivery estimated time for the facility 200, may include the geographical position of the delivery vehicle 620, or may include data for making an inquiry as to whether the user can receive goods. In addition, the delivery assist apparatus 300 may transmit data for making an inquiry as to whether a service of receiving the contents described above will be used to the user terminal in advance.

Figure 6:
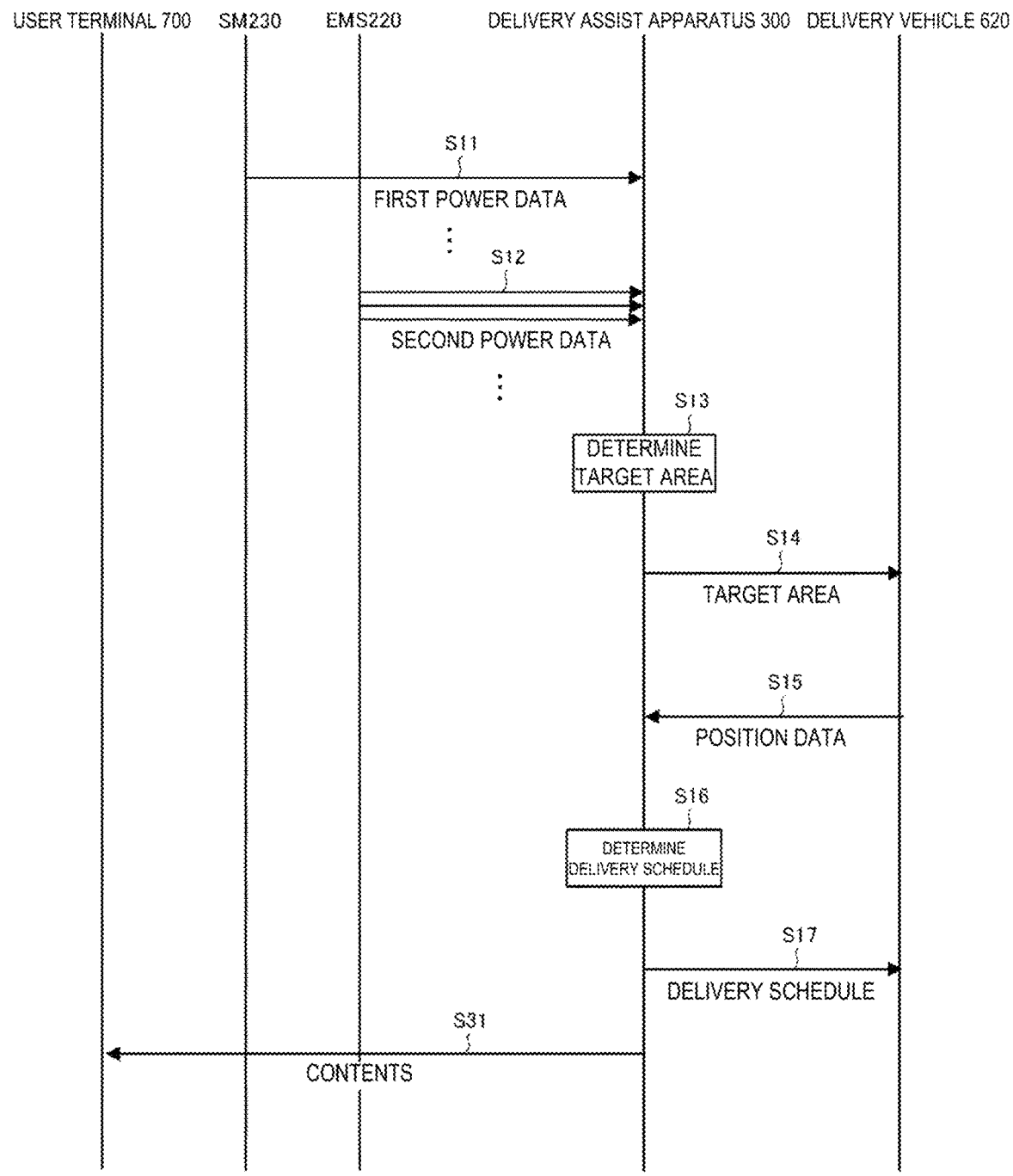
FIG. 6 is a diagram illustrating a delivery assist method according to modification 1.

For example, as illustrated in FIG. 6, in Step S31, the delivery assist apparatus 300 may transmit the contents to a user terminal 700. In other words, when the delivery assist apparatus 300 determines the target area, the delivery assist apparatus 300 may transmit the contents to the user terminal 700. Alternatively, when the delivery assist apparatus 300 determines the delivery schedule of goods, the delivery assist apparatus 300 may transmit the contents to the user terminal 700. Alternatively, when the delivery assist apparatus 300 updates the delivery schedule of goods, the delivery assist apparatus 300 may transmit the contents to the user terminal 700.

Modification 2

Modification 2 of the embodiment will be described below. Differences from the embodiment will mainly be described below.

In the embodiment, an example of a case in which the delivery assist apparatus 300 is implemented by one apparatus for the purpose of clarifying description is illustrated. In contrast, in modification 2, an example of a case in which the delivery assist apparatus 300 is implemented by two or more apparatuses belonging to two or more entities is illustrated.

Figure 7:
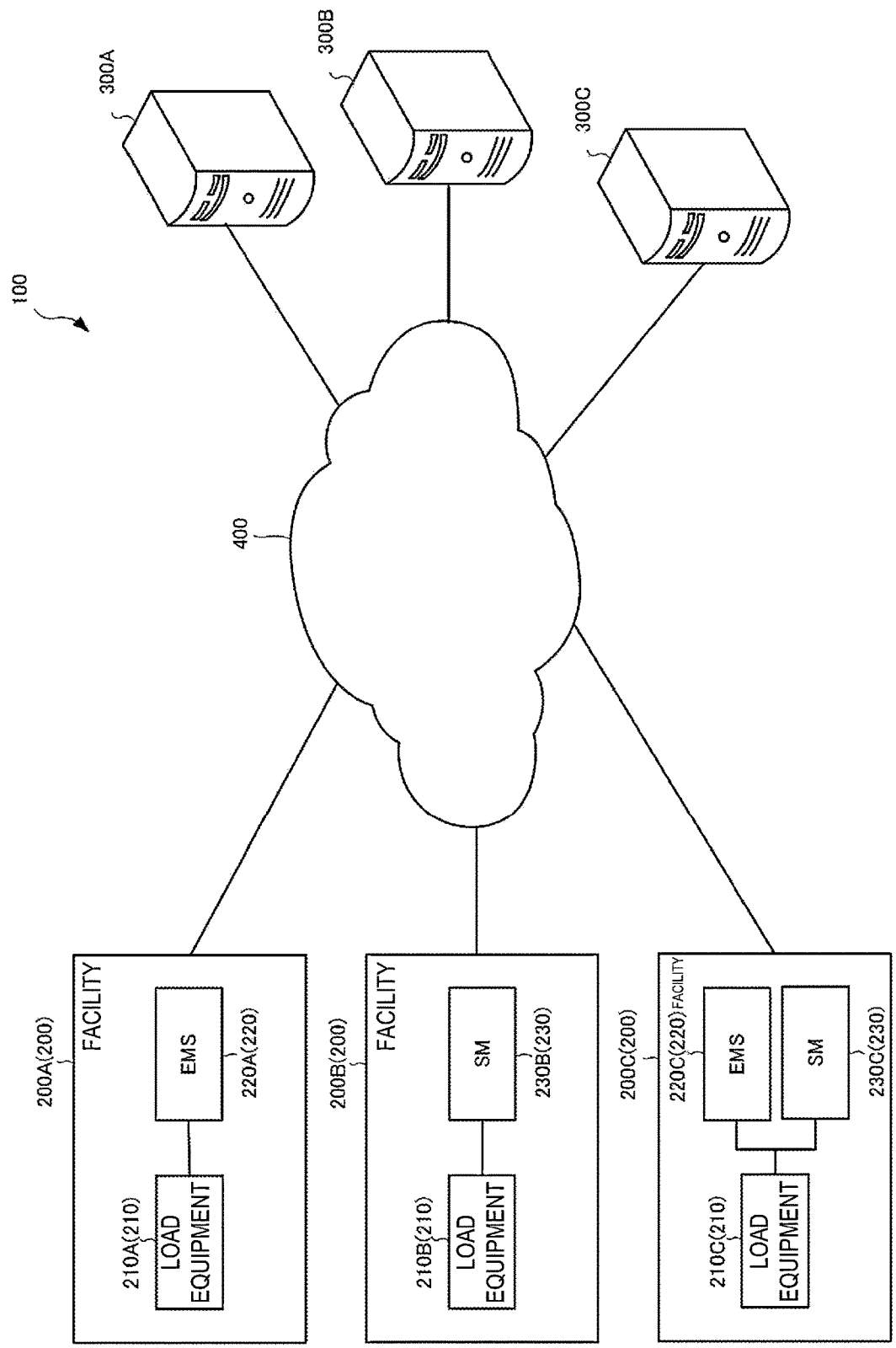
FIG. 7 is a diagram illustrating a delivery assist system 100 according to modification 2.

As illustrated in FIG. 7, the delivery assist system 100 includes a server 300A, a server 300B, and a server 300C, instead of the delivery assist apparatus 300 illustrated in FIG. 1.

The server 300A is a server that belongs to an entity managing the SM 230. Such an entity may be a power generation company, a power transmission and distribution company, a retailer, or the like. The server 300A receives the first power data from the SM 230 at the first interval. The server 300A may transmit the first power data to the server 300C at the first interval.

The server 300B is a server that belongs to an entity managing the EMS 220. Such an entity may be a resource aggregator or the like. The server 300B receives the second power data from the EMS 220 at the second interval shorter than the first interval. The server 300B may transmit the second power data to the server 300C at the second interval.

The server 300C is a server that belongs to an entity assisting a delivery agent. The server 300C has a function similar to that of the delivery assist apparatus 300 described above, except that the server 300C receives the power data via the server 300A and the server 300B.

In such a case, at the time point when the first power data arrives at the server 300C, a time lag is considered to be present between arrival timing of the first power data and measurement timing of the first power data. Similarly, at the time point when the second power data arrives at the server 300C, a time lag is considered to be present between arrival timing of the second power data and measurement timing of the second power data.

Thus, the server 300C may determine whether the power data is used in the first procedure, based on the time lag described above. For example, the server 300C may execute the first procedure by using the power data having a time lag smaller than a first threshold without using the power data having a time lag larger than the first threshold. Similarly, the server 300C may determine whether the power data is used in the second procedure, based on the above-described time lag. For example, the server 300C may execute the second procedure by using the power data having a time lag smaller than a second threshold without using the power data having a time lag larger than the second threshold.

The first threshold may be different from the second threshold. For example, the first threshold may be larger than the second threshold. Alternatively, the server 300C may use the power data in the first procedure, regardless of the above-described time lag.

In modification 2, an example of a case in which three servers are provided is illustrated. However, modification 2 is not limited thereto. The number of servers managed by entities different from each other may be two, or may be four. For example, in addition to the servers 300A to 300C described above, a server belonging to a delivery agent may be provided. In addition, the server 300A may include a server belonging to each of a power generation company, a power transmission and distribution company, and a retailer.

Modification 3

Modification 3 of the embodiment will be described below. Differences from the embodiment will mainly be described below.

In modification 3, two or more facilities 200 included in the predetermined area 500 include a third facility that allows use of a delivery locker, and a fourth facility that does not allow use of a delivery locker. The delivery locker is a locker that temporarily stores goods regardless of whether the user is absent. The third facility may be a facility in which a delivery locker is provided, or may be a facility for which use of a delivery locker is requested when delivery of goods is requested. The fourth facility may be a facility in which a delivery locker is not provided, or may be a facility for which use of a delivery locker is not requested when delivery of goods is requested. In such a case, the delivery assist apparatus 300 (management unit 220) manages data indicating whether the facility 200 is the third facility or the fourth facility in advance, and may determine the third facility to be the facility 200 at which the user is present.

In such a case, the delivery assist apparatus 300 executes the first procedure and the second procedure, based on the data indicating whether the facility 200 is the third facility or the fourth facility, in addition to the power data. For example, the delivery assist apparatus 300 may execute the first procedure and the second procedure, based on the power data of the fourth facility, without using the power data of the third facility. In other words, in the first procedure, the number of facilities with recipients being present is summed up based on the number of third facilities and the power data of the fourth facilities, and the delivery area 510 having the largest number of facilities 200 with users being present out of two or more delivery areas 510 included in the predetermined area 500 is determined to be the target area. Then, in the second procedure, the delivery schedule of goods for two or more target facilities including the facilities with recipients being present is determined based on the third facilities located in the target area and the power data of the fourth facilities.

Here, the delivery locker is not limited to a locker provided in the premises of the facility 200, but includes a locker provided outside the premises of the facility 200. The locker provided outside the premises of the facility 200 may be installed by a delivery agent, may be installed by a company cooperating with the delivery agent, or may be provided at a railroad station or the like. In this manner, when the delivery locker is provided outside the premises of the facility 200, the first procedure and the second procedure described above are executed, with the geographical position of the facility 200 being interpreted as the geographical position of the delivery locker.

Modification 4

Modification 4 of the embodiment will be described below. Differences from the embodiment will mainly be described below.

In modification 4, the second power data transmitted from the EMS 220 may include power consumption data for each piece of equipment provided in the facility 200. The delivery assist apparatus 300 (controller 330) executes the second procedure, based on the power consumption data for each piece of equipment. The EMS 220 has a function of acquiring the power consumption data for each piece of equipment. The EMS 220 may acquire the power consumption data from each piece of equipment, or may acquire the power consumption data from a current transformer (CT) colocated with each piece of equipment. The EMS 220 may acquire the power consumption data of all of the pieces of equipment provided in the facility 200, or may acquire the power consumption data of some of the pieces of equipment provided in the facility 200.

For example, when power consumption of equipment used while the user is at the facility 200 exceeds a threshold, the delivery assist apparatus 300 may determine that the user is at the facility 200. For example, such equipment may be a dryer, a television, an air conditioner, lighting equipment, or the like. Alternatively, when power consumption of equipment used while the user is unable to receive goods exceeds a threshold, the delivery assist apparatus 300 may determine the user to not be at the facility 200. For example, such equipment may be a water heater for a bath or the like.

Modification 5

Modification 5 of the embodiment will be described below. Differences from the embodiment will mainly be described below.

In modification 5, the delivery assist apparatus 300 may transmit a message related to delivery prediction or delivery results of goods to an operator of electronic commerce (EC) used for purchase of goods. The message includes a route for the facilities 200 visited by the delivery agent, predicted probability of success of delivery of goods, actual probability of success of delivery of goods, or the like.

In addition, with the operator of EC and the delivery assist apparatus 300 cooperating with each other, the delivery assist apparatus 300 may receive, from the operator of EC, data indicating whether a time frame (hereinafter reception time frame) in which reception of goods is desired is specified. The delivery assist apparatus 300 manages the facility 200 for which the reception time frame is specified and the reception time frame, and regarding the reception time frame, the delivery assist apparatus 300 may determine the facility 200 for which the reception time frame is specified to be a facility 200 at which the user is present.

When the current time becomes within the reception time frame, the delivery assist apparatus 300 may update the delivery schedule, based on the power data of the facility 200.

In such a case, the delivery assist apparatus 300 may execute the first procedure and the second procedure, based on the data indicating whether the reception time frame is specified, in addition to the power data. For example, the delivery assist apparatus 300 may execute the first procedure and the second procedure, based on the power data of the facility 200 for which the reception time is not specified, without using the power data of the facility 200 for which the reception time frame is specified. In other words, in the first procedure, the number of facilities with recipients being present is summed up based on the number of facilities 200 for which the reception time frame is specified and the power data of the facilities 200 for which the reception time is not specified, and the delivery area 510 having the largest number of facilities 200 with users being present out of two or more delivery areas 510 included in the predetermined area 500 is determined to be the target area. Then, in the second procedure, the delivery schedule of goods for two or more target facilities including the facilities with recipients being present is determined based on the facilities 200 for which the reception time frame is specified and which is located in the target area and the power data of the facilities 200 for which the reception time is not specified. Note that, when goods need to be delivered at a time not within the reception time frame, the delivery assist apparatus 300 may execute the first procedure and the second procedure by using the power data of the facility 200 for which the reception time frame is specified.

Other Embodiments

Although the present disclosure is described by the above-described embodiment, it should not be understood that the description and the drawings, which form a part of this disclosure, limit this disclosure. Various alternative embodiments, examples, and operational techniques will be apparent to those skilled in the art from this disclosure.

In the embodiment, the SM 230 is illustrated as a wattmeter that measures power (tidal power or reverse tidal power) of the facility 200. However, the embodiment is not limited to this. The wattmeter may be a current transformer (CT) that is connected to a portion of a main power line anterior to a point of branch in a power distribution panel. The wattmeter may be a CT connected to a portion of a branch power line posterior to a point of branch in the power distribution panel. When the wattmeter is a CT, an apparatus (for example, the EMS 220) having a function of performing communication with the delivery assist apparatus 300 and the CT are connected, and the power data may be transmitted from the apparatus connected to the CT to the delivery assist apparatus 300.

In the embodiment, the delivery vehicle 620 is illustrated as a transporting means for transporting goods to the target facility. However, the embodiment is not limited to this. The transporting means may be a drone, or may be a robot.

Although there is no specific reference made in the embodiment, a delivery agent may not follow the delivery schedule of goods that is determined or updated by the delivery assist apparatus 300. For example, the delivery agent may change the delivery schedule of goods with a rule of thumb or the like. In such a case, the delivery assist apparatus 300 may provide a user interface (UI) for changing the delivery schedule of goods. The delivery assist apparatus 300 learns the facility 200 whose delivery schedule has been changed, and may determine the delivery schedule, based on the learning results when there is delivery of goods for the facility 200 in the next delivery.

Although there is no specific reference made in the embodiment, the delivery assist apparatus 300 may determine loading order of goods into the delivery vehicle 620, based on the delivery schedule of goods, and notify the delivery agent of the determined loading order.

Although there is no specific reference made in the embodiment, the delivery assist apparatus 300 may learn whether the user is at the facility 200 by associating the information with a predetermined parameter. For example, the predetermined parameter may be a time frame, the day of the week, whether reception time is specified, power of the facility 200, or the like. The delivery assist apparatus 300 may determine a probability that the user is present at the facility 200 (hereinafter user present probability), based on learning results, and determine the facility 200 having the determined user present probability higher than a threshold to be a facility 200 at which the user is present.

Although there is no specific reference made in the embodiment, the power may be instantaneous power (kW), or may be integrated electric energy (kWh). For example, output power data may include instantaneous power (kW), or may include integrated electric energy (kWh).

Although there is no specific reference made in the embodiment, a program causing a computer to execute each of the processes performed by the delivery assist apparatus 300 may be provided. The program may be recorded in a computer readable medium. Use of a computer readable medium enables the program to be installed on a computer. Here, the computer readable medium on which the program is recorded may be a non-transitory recording medium. The non-transitory recording medium is not specifically limited, and may be, for example, a recording medium such as a CD-ROM and a DVD-ROM.

Alternatively, a chip including a memory that stores a program for executing each of the processes performed by the delivery assist apparatus 300 and a processor that executes the program stored in the memory may be provided.

The contents of Japanese Patent Application No. 2019-90354 (filed on May 13, 2019) are incorporated herein by reference in its entirety.

The invention claimed is:

1. A delivery assist apparatus, comprising:
  a communication module that receives power data of at least one facility among two or more predetermined facilities located in a predetermined area; and
  a processor that determines a procedure of delivering goods to the two or more predetermined facilities, based on the power data, wherein
  at first timing, the processor executes a first procedure of determining a target area out of two or more delivery areas comprised in the predetermined area, based on the power data satisfying a first condition based on the first timing, and
  at second timing after the first timing, the processor executes a second procedure of determining a delivery schedule of the goods for two or more target facilities located in the target area determined at the first procedure, based on the power data satisfying a second condition based on the second timing.

2. The delivery assist apparatus according to claim 1, wherein
  at third timing after the second timing, the processor updates the delivery schedule of the goods, based on the power data satisfying a third condition based on the third timing.

3. The delivery assist apparatus according to claim 1, wherein
  the two or more predetermined facilities comprise a first facility comprising a smart meter,
  the communication module receives first power data of the first facility at a first interval, and
  the processor executes the first procedure, based on the first power data.

4. The delivery assist apparatus according to claim 3, wherein
  the two or more predetermined facilities comprise a second facility comprising a management apparatus that manages the power data at an interval shorter than the first interval,
  the communication module receives second power data of the second facility at a second interval shorter than the first interval, and
  the processor executes the second procedure, based on the second power data.

5. The delivery assist apparatus according to claim 1, wherein
  the processor determines at least one of order of visiting the two or more target facilities or a route for visiting the two or more target facilities as the delivery schedule of the goods.

6. The delivery assist apparatus according to claim 1, wherein
  the two or more predetermined facilities comprise:
    a third facility allowing use of a delivery locker, and
    a fourth facility not allowing use of the delivery locker, and
  the processor executes the first procedure and the second procedure, based on data indicating whether the facility is the third facility or the fourth facility, in addition to the power data.

7. The delivery assist apparatus according to claim 4, wherein
  the second power data comprises power consumption data for each piece of equipment provided in the second facility, and
  the processor executes the second procedure, based on the power consumption data for each piece of equipment.

8. The delivery assist apparatus according to claim 1, wherein
  the delivery assist apparatus transmits contents related to the delivery schedule of the goods to a user terminal.

9. A delivery assist system, comprising:
  a communication module that receives power data of at least one facility among two or more predetermined facilities located in a predetermined area; and
  a processor that determines a procedure of delivering goods to the two or more predetermined facilities, based on the power data, wherein
  at first timing, the processor executes a first procedure of determining a target area out of two or more delivery areas comprised in the predetermined area, based on the power data satisfying a first condition based on the first timing, and
  at second timing after the first timing, the processor executes a second procedure of determining a delivery schedule of the goods for two or more target facilities located in the target area determined at the first procedure, based on the power data satisfying a second condition based on the second timing.

10. A delivery assist method, comprising:
receiving power data of at least one facility among two or more predetermined facilities located in a predetermined area;
executing, at first timing, a first procedure of determining a target area out of two or more delivery areas comprised in the predetermined area, based on the power data satisfying a first condition based on the first timing; and
executing, at second timing after the first timing, a second procedure of determining a delivery schedule of goods for two or more target facilities located in the target area determined at the first procedure, based on the power data satisfying a second condition based on the second timing.

11. The delivery assist apparatus according to claim 1, wherein
the second timing is a timing that a delivery vehicle delivering the goods arrives or approaches the target area determined at the first procedure.

12. The delivery assist apparatus according to claim 1, wherein
the processor,
in response to executing the first procedure at the first timing, based on the power data, determines and manages a delivery vehicle delivering the goods, and
in response to executing the second procedure at the second timing, determines the delivery schedule of goods wherein the delivery vehicle arrives or approaches the target area determined at the first procedure.

13. The delivery assist apparatus according to claim 12, wherein
the delivery vehicle includes a drone or a robot.

14. The delivery assist system according to claim 9, wherein
the second timing is a timing that a delivery vehicle delivering the goods arrives or approaches the target area determined at the first procedure.

15. The delivery assist system according to claim 9, wherein
the processor,
in response to executing the first procedure at the first timing, based on the power data, determines and manages a delivery vehicle delivering the goods, and
in response to executing the second procedure at the second timing, determines the delivery schedule of goods wherein the delivery vehicle arrives or approaches the target area determined at the first procedure.

16. The delivery assist system according to claim 15, wherein
the delivery vehicle includes a drone or a robot.

17. The delivery assist method according to claim 10, wherein
the second timing is a timing that a delivery vehicle delivering the goods arrives or approaches the target area determined at the first procedure.

18. The delivery assist method according to claim 10, wherein
in executing of the first procedure at the first timing, a delivery vehicle delivering the goods is determined and managed, and
in executing of the second procedure at the second timing, the delivery schedule of goods is determined wherein the delivery vehicle arrives or approaches the target area determined at the first procedure.

19. The delivery assist method according to claim 18, wherein
the delivery vehicle includes a drone or a robot.

* * * * *